United States Patent [19]

Roettgen

[11] 4,423,751

[45] Jan. 3, 1984

[54] BYPASS VALVE AND ALARM ASSEMBLY

[75] Inventor: Leslie A. Roettgen, Columbus, Ind.

[73] Assignee: Cummins Engine Company, Inc., Columbus, Ind.

[21] Appl. No.: 318,101

[22] Filed: Nov. 5, 1981

Related U.S. Application Data

[63] Continuation-in-part of Ser. No. 214,673, Dec. 9, 1980, Pat. No. 4,366,837.

[51] Int. Cl.³ .............................................. F16K 37/00
[52] U.S. Cl. ..................................... 137/557; 137/508; 137/540; 210/90; 210/130; 116/268; 340/607; 340/626
[58] Field of Search ...................... 137/508, 512.2, 540, 137/543.21, 554, 557; 116/268; 210/90, 130; 340/607, 611, 614, 626

[56] References Cited

U.S. PATENT DOCUMENTS

| | | | |
|---|---|---|---|
| 2,810,034 | 10/1957 | Grant | 200/81.9 |
| 2,879,892 | 3/1959 | Frakes | 210/90 |
| 3,127,586 | 3/1964 | Heyn et al. | 340/60 |
| 3,295,507 | 1/1967 | Carter et al. | 123/196 |
| 3,644,915 | 2/1972 | McBurnett | 340/239 F |
| 3,790,931 | 2/1974 | Leveraus | 340/60 |
| 3,794,168 | 2/1974 | Perkins | 210/130 |
| 4,142,673 | 3/1979 | Kachman | 340/607 |

FOREIGN PATENT DOCUMENTS

| | | |
|---|---|---|
| 1081443 | 8/1967 | United Kingdom . |
| 1097773 | 1/1968 | United Kingdom . |
| 1119032 | 7/1968 | United Kingdom . |
| 1189492 | 4/1970 | United Kingdom . |

Primary Examiner—Alan Cohan
Assistant Examiner—John A. Rivell
Attorney, Agent, or Firm—Sixbey, Friedman & Leedom

[57] ABSTRACT

A "snap action" early warning bypass valve assembly (2), responsive to fluid pressure differentials and/or low pressure, functions as both an electrical switch to provide an indication of low pressure or an impending fluid bypass and as a mechanical valve to actually implement the fluid bypass. The valve assembly includes a sealing piston (24, 124) supported by a retaining surface (18, 106) having a central bore (22, 110) formed therein. The sealing piston (24, 124) contains a bypass aperture (36) and is shaped to present a differential sealing area (39) to fluid circulating within the central bore (22, 110). A spring-biased bypass disc (42, 134) covers the bypass aperture (36) to present a central sealing area (45) to fluid within the central bore (22,110). A first pressure differential acting simultaneously across the central (45) and differential (39) sealing areas forces piston (24) into contact with an electrical terminal pin (48,92,126) thus energizing an alarm circuit (48–64,90). A second, greater pressure differential acting across the central sealing area (45) alone pushes the bypass disc (42, 134) away from the bypass aperture (36) to complete the bypass operation. A low pressure sensing means (140) including a low pressure piston (142) biased to a no alarm position by spring (128) and to an alarm position by spring (150) is responsive to fluid pressure in a bypass conduit (132) below a predetermined level to energize the same alarm circuit (48–64, 90).

13 Claims, 7 Drawing Figures

BYPASS VALVE AND ALARM ASSEMBLY

CROSS REFERENCE TO RELATED APPLICATION

This application is a continuation-in-part of U.S. patent application Ser. No. 214,673 filed Dec. 9, 1980, now U.S. Pat. No. 4,366,837 entitled Early Warning Bypass Valve Assembly.

DESCRIPTION

1. Technical Field

This invention relates to the field of fluid bypass valves and more particularly to a valve assembly which provides an indication of a low pressure condition or an impending bypass condition prior to the initiation of the fluid bypass operation.

2. Background Art

Fluid treatment elements such as fuel filters, oil filters or oil coolers in a fluid distribution system are vulnerable to many types of potentially damaging malfunctions. For example, plugged or clogged fluid treatment elements usually cause blockage of fluid flow through the distribution system, and if left unattended this fluid flow blockage can have dire consequences, even leading to catastrophic failure of the kind which results when a clogged oil filter prevents the passage of lubricating fluid to critical parts of an internal combustion engine. Rupture or destruction of a fluid treatment element can also occur, due to excessive fluid flow surges in the supply system, giving rise to circulation of untreated fluid to various operating points around the system. In order to overcome the deleterious effects associated with obstructed, ruptured or otherwise degenerate fluid treatment elements, various warning and/or bypass devices have heretofore been proposed. U.S. Pat. No. 2,810,034 issued to Grant on Oct. 15, 1957 and U.S. Pat. No. 3,127,586 issued to Heyn et al. on Mar. 31, 1964 both disclose devices which generate warning signals when oil flow through an oil filter is reduced due to plugging. U.S. Pat. No. 2,879,892 issued to Frakes on Mar. 31, 1959; U.S. Pat. No. 3,295,507 issued to Carter et al on Jan. 3, 1967; U.S. Pat. No. 3,644,915 issued to McBurnett on Feb. 22, 1972 and U.S. Pat. No. 3,790,931 issued to Leveraus on Feb. 5, 1974, all disclose filter bypass mechanisms wherein fluid is automatically rerouted around a filtering element in response to the clogging of the element while an alarm device indicates that the filter bypass operation has occurred. Still other warning devices are known for responding to excessively low oil pressures. The purpose of devices of this latter type is to warn an engine operator when an insufficient amount of oil is circulating through the lubrication circuit of the engine.

Despite the protection furnished by the aforementioned devices, however, many limitations in the structure and functioning of prior art bypass valves and warning circuits remain. In arrangements of the type illustrated in Frakes and Carter, the bypass valve itself is separate from the bypass warning circuit, and hence neither arrangement takes advantage of the economies of size and cost which could be obtained from constructing the bypass valve/warning ciruit as a unitary or integral assembly. Leverause and McBurnett, on the other hand, do combine the various elements of a bypass valve and a warning circuit, but fail to appreciate the desirability of activating the warning system before the bypass valve opens and permits impure or contaminated fluid to reenter the fluid distribution system downstream from the filter. As a net result, the prior art does not adequately address the need for a fluid bypass valve and warning device which is simple to manufacture yet provides effective early warning and subsequent reliable protection against both clogging and flow surges in fluid distribution systems.

DISCLOSURE OF THE INVENTION

It is therefore an object of the present invention to provide an early warning bypass valve assembly which is capable of bypassing fluid around an obstruction in a fluid distribution system.

It is an additional object of the present invention to provide an early warning bypass valve assembly which functions to bypass fluid around an obstruction in a fluid distribution system while also providing an alarm signal indicative of the bypass operation.

It is yet an additional object of the present invention to provide an early warning bypass valve assembly including a valve mechanism and a warning circuit wherein the valve mechanism functions both as a fluid valve for initiating a fluid bypass operation and as an electrical switch for energizing a warning circuit.

It is still an additional object of the present invention to provide an early warning bypass valve assembly including a valve mechanism which functions both as a fluid valve for initiating a fluid bypass operation and as an electrical switch for energizing a warning circuit such that the warning circuit energization occurs prior to the fluid bypass operation.

It is another object of the present invention to provide an early warning bypass valve assembly which responds to a first fluid pressure differential across the valve assembly by energizing a warning circuit to indicate impending fluid bypass operation and which responds to a second, greater fluid pressure differential across the valve assembly to actually implement the fluid bypass operation while continuing to energize the warning circuit.

It is also an object of the present invention to provide an early warning bypass valve assembly which responds to potentially damaging fluid flow surges upstream of the fluid treatment system by energizing a warning circuit to indicate the presence of the flow surges while protecting the treatment elements from rupture.

Still another object of this invention is to provide a bypass valve and alarm assembly which incorporates both an early warning bypass means and a low pressure sensing means for responding to fluid pressure below a predetermined level.

These and other objects of the present invention are achieved in a bypass valve and alarm assembly which employs a sealing piston and a low pressure piston slidably mounted inside a cavity formed at the intersection of inlet, outlet and bypass conduits. The sealing piston includes a central bore having a grommet or the like disposed therein to form a bypass aperture, and a bypass disc normally closes the bypass aperture in the grommet. A retaining seat also having a central bore is fitted around the interior surface of the cavity at a location between the bypass conduit and the inlet and outlet conduits, and a spring contacts the bypass disc to bias the bypass disc and sealing piston into fluid-tight contact with the retaining seat. Under normal fluid flow conditions the pressure differential acting across the sealing piston is insufficient to overcome the spring bias, and the bypass disc, sealing piston and retaining seat maintain their fluid-tight relationship to prevent any fluid flow between the inlet and bypass conduits. Periodic flow surges or blockage of the fluid flow downstream from the outlet conduit, however, causes the fluid pressure in the inlet conduit to increase relative to the residual pressure of any fluid present in the bypass conduit. When this pressure differential reaches a first predetermined level, the force exerted by the pressurized fluid against the sealing piston is sufficient to push the sealing piston away from the retaining seat with a "snap-action" effect, while the bypass disc remains in place over the grommet. The sealing piston continues to slide along the interior of the cavity until contacting a terminal pin which projects into the cavity interior, whereupon an electrical circuit through the terminal pin is completed and an alarm device is energized. If the obstruction or surge in the flow path does not subside, the pressure differential acting across the sealing piston continues to build until a second predetermined level is reaches, at which point the force exerted by the pressurized fluid overcomes the spring bias (increased somewhat by piston/disc movement and spring compression) and pushes the bypass disc away from the grommet. Fluid then passes through the sealing piston and on into the bypass conduit to complete the fluid bypass operation. To respond to excessively low fluid pressure, the low pressure sensing means includes a low pressure piston for responding to loss of normal operating fluid pressure within the bypass conduit to cause the low pressure piston to move into engagement with the same terminal pin as is engaged by the sealing piston to energize the same alarm circuit.

BRIEF DESCRIPTION OF THE DRAWINGS

The various features, objects and advantages of the present invention will become more apparent from the following Brief Description of the Drawings, wherein.

BEST MODE FOR CARRYING OUT THE INVENTION

Figure 1:
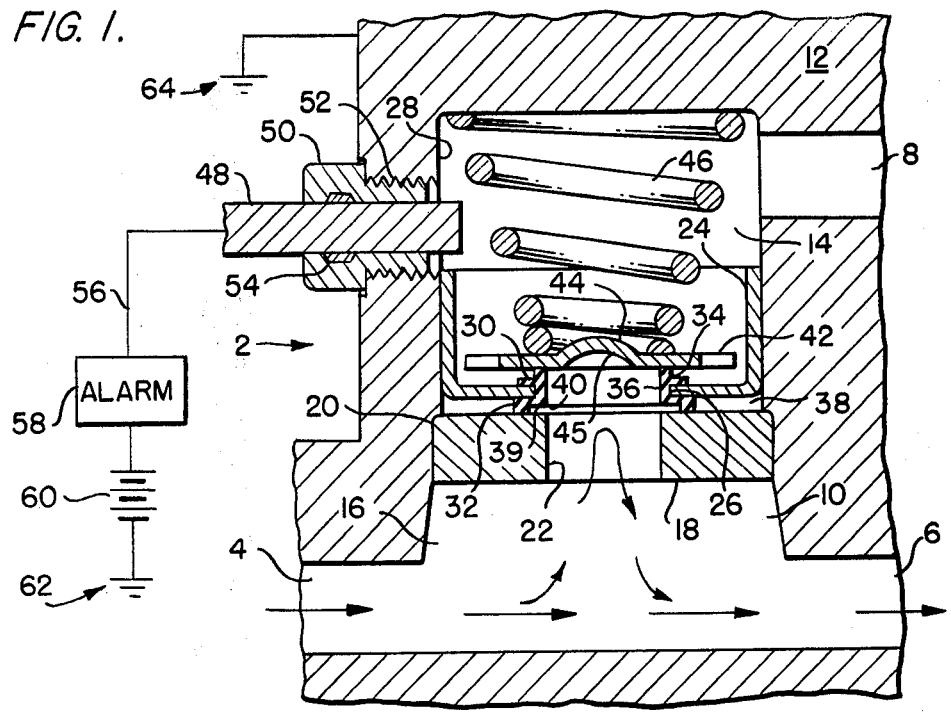
FIG. 1 is a cross-sectional view of the early warning bypass valve assembly of the present invention, showing the relative position of the valve elements during normal fluid flow conditions.

The early warning bypass valve assembly of the present invention, indicated generally at 2 in FIG. 1, is positioned in a fluid distribution system at the three-way intersection of fluid inlet, outlet, and bypass conduits 4, 6, 8. A cylindrical cavity 10 formed in supporting material 12 surrounding the conduits serves to receive the assembly. Supporting material 12 is fabricated from a suitably durable, electrically-conductive material. Cavity 10 is divided into upper and lower chambers 14, 16 such that the diameter of lower chamber 16 is greater than the diameter of upper chamber 14. An annular retaining seat 18 is fitted between upper and lower chambers 14, 16 and is secured in fluid-tight fashion to the circumferential lip 20 formed as a result of the difference in diameters between the upper and lower chambers. A circular bore 22 at the center of retaining seat 18 provides for the passage of fluid therethrough. A cup-shaped sealing piston 24 having a circular central bore 26 axially aligned with bore 22 is slidably mounted within upper chamber 14. Sealing piston 24, which is constructed from or plated with an electrically-conductive material, has an outer diameter approximately equal to the diameter of upper chamber 14. Thus, the sealing piston electrically contacts the inner surface 28 of cavity 10 in essentially fluid-tight fashion while retaining the capacity for longitudinal movement inside the upper chamber. A sealing ridge is positioned around the lower periphery of central bore 26 to support piston 24 on retaining seat 18 and to furnish a differential sealing area between the piston and the retaining seat as described in greater detail hereinbelow. In the preferred embodiment of the present invention, the sealing ridge is provided by a structure such as grommet 30, but other structures containing ridges would be equally suitable. Grommet 30 includes a lower lip 32 and an upper lip 34 disposed within central bore 26 to form a bypass aperture 36 in the sealing piston 24. It can be seen in FIG. 1 that the outer diameter of lower lip 32 terminates at a predetermined distance from inner surface 28 to define an annular cavity 38 between the sealing piston and retaining seal 18. It can also be seen in FIG. 1 that the inner diameter of lower lip 32 is larger than the diameters of both bypass aperture 36 and bore 22, thereby creating a lower surface 39. Lower surface 39 is spaced from retaining seat 18 to define a second annular cavity 40. A lobed bypass disc 42 having a center section 44 with a lower surface 45 rests on the upper lip 34 of grommet 30 to completely cover bypass aperture 36. The bypass disc 42, the grommet 30 including upper and lower lips 34, 32 and the sealing piston 24 are all urged or biased together in fluid-tight relationship against the retaining seat 18 by the action of a spring 46 disposed within upper chamber 14. In this manner, lower surface 45 of bypass disc 42 presents a central sealing area to fluid within the circular bore 22 of retaining seat 18, lower surface 39 of grommet 30 presents an additional or differential sealing area to fluid within the circular bore 22, and lower surface 45 together with lower surface 39 present a total sealing area to fluid within the circular bore.

The warning circuit of the present invention includes an electrically-conductive terminal pin 48 which is embedded in an electrically nonconductive bolt 50 and inserted through a threaded opening 52 in supporting material 12 such that one end of terminal pin 48 projects into the interior of upper chamber 14 above sealing piston 24. If desired, a retaining clip 54 may be inserted in bolt 50 to further secure terminal pin 48 against movement and to prevent fluid leakage from cavity 10. An electrical lead 56 connects terminal pin 48 to an alarm device 58. Alarm device 58 is in turn connected to the positive terminal of a power source 60. The alarm device may consist of a light, bell, buzzer or the like, which as explained more fully hereinbelow, is energized by battery 60 in response to the completion of a circuit through the alarm device. The ground terminal of power source 60 is grounded as indicated at 62, while electrically-conductive supporting material 12 is grounded as indicated at 64.

The operation of early warning bypass valve assembly 2 is explained in detail in connection with FIGS. 1, 2 and 3. Referring again to FIG. 1, inlet conduit 4 is connected to a source of pressurized fluid such as a pump or compressor (not shown) and outlet conduit 6 is connected to a fluid treatment element such as a fuel or lubricant filter (not shown). Bypass conduit 8 is connected to a fluid network (not shown) which completely bypasses the fluid treatment element. The biasing force of spring 46 urges sealing piston 24 away from terminal pin 48 to prevent any mechanical or electrical contact between the terminal pin and the sealing piston. The center section 44 of bypass disc 42 is likewise urged by spring 46 into sealing arrangement with the upper lip 34 of grommet 30 as previously mentioned to prevent any flow of fluid from lower chamber 16 through the bypass aperture 36 in sealing piston 24 to the upper chamber 14 of cavity 10. Accordingly, a fluid flow path between inlet conduit 4 and outlet conduit 6 is established as indicated by the arrows in FIG. 1 and the electrical circuit through alarm device 58 is opened at terminal pin 48.

During normal flow conditions the differential in pressure between fluid circulating within the lower chamber 16 of cavity 10 and any residual fluid present in bypass conduit 8 is insufficient to overcome the force of spring 46. Bypass disc 42 and sealing piston 24 thus remain firmly in place to block any fluid flow from inlet conduit 4 to bypass conduit 8. If some obstruction or surge in the fluid flow path downstream from outlet conduit 6 should occur, the pressure of the fluid circulating in lower chamber 16 of cavity 10 will increase relative to the residual pressure in bypass conduit 8, and hence the pressure differential across valve assembly 2 will increase. When this pressure differential reaches a first predetermined level, the force exerted by the fluid against the total sealing area of both lower surface 39 and lower surface 45 will begin to overcome the residual pressure in bypass conduit 8 and the bias exerted by spring 46. Sealing piston 24 will begin to move away from retaining seat 18, whereupon fluid will flow past the lower lip 32 of grommet 30 into cavity 38. The resulting increase in contact area between the pressurized fluid from lower chamber 16 and the sealing piston 24 creates an additional force which opposes the bias of spring 46. This additional force produces a "snap-action" effect, pushing sealing piston 24 rapidly along the inner surface 28 of upper chamber 14 and into abutment with the projecting terminal pin 48. The point of abutment, indicated at 66 in FIG. 2, serves to arrest the movement of sealing piston 24 while simultaneously skewing the sealing piston with respect to the inner surface 28, thus insuring electrical contact between the supporting structure 12, the sealing piston and the terminal pin. An electrical circuit from ground 62 through power source 60, alarm device 58, lead 56, terminal pin 48, sealing piston 24, and supporting structure 12 to ground 62 is thereafter completed, and the alarm device is energized to furnish a visual or audible indication of the downstream obstruction or surge. Due to the additional force supplied by the fluid circulating in cavity 38, early warning bypass valve assembly 2 is relatively unaffected by fluid pressure fluctuations which might otherwise cause spring 46 to push sealing piston 24 back out of contact with terminal pin 48. Consequently, the operation of the early warning bypass valve is stabilized and alarm device 58 remains energized until the downstram obstruction or fluid surge is actually removed.

Figure 2:
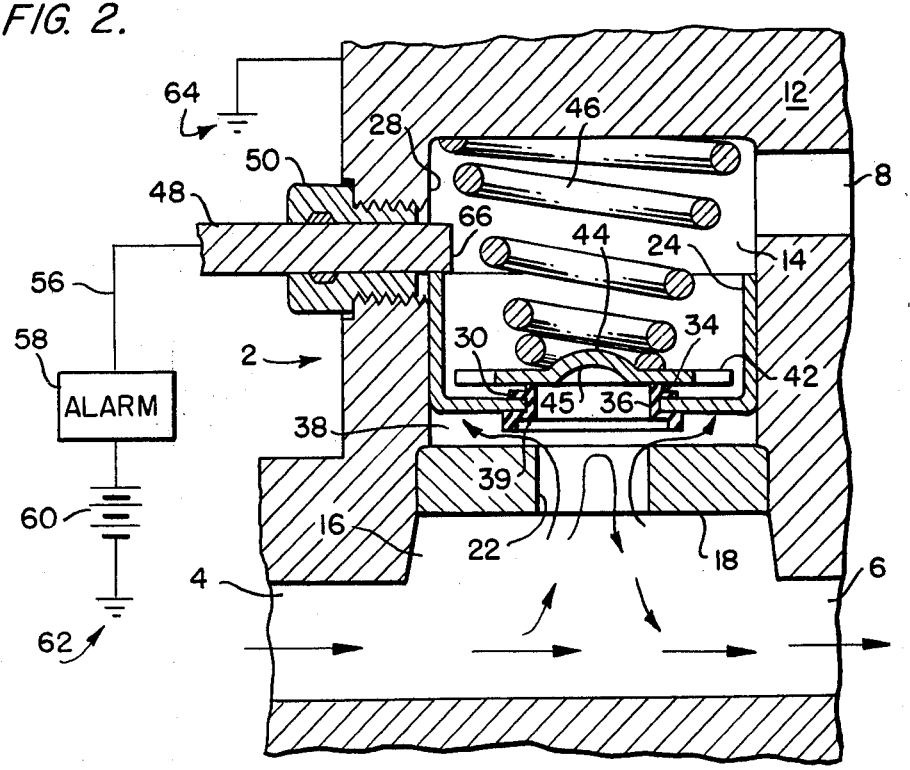
FIG. 2 is a cross-sectional view of the early warning bypass valve assembly of the present invention showing the relative position of the valve elements when the fluid pressure differential across the valve assembly has reached the first predetermined level and the alarm device has been activated to warm of impending fluid bypass operation.

Although early warning bypass valve assembly 2 responds to an increase in fluid pressure differential by energizing alarm device 58, it can be seen upon further examination of FIG. 2 that fluid communication between inlet conduit 4 and bypass conduit 8 continues to be blocked as long as the fluid pressure differential does not rise beyond the aforementioned first predetermined level. This action of the bypass valve results from the fact that the force initially opposing the bias of spring 46 and the residual pressure in bypass conduit 8 when valve assembly 2 is in the closed position consists of two components. The first force component is generated by fluid present within the sealed-off bypass aperture 36 and in contact with the central sealing area provided by the lower surface 45 of bypass disc center section 44. The second force component is generated by fluid in contact with the differential sealing area provided by the lower surface 39 of grommet 30. When the fluid pressure differential reaches the first predetermined level, the two force components additively combine across the total sealing area comprised of lower surface 45 and lower surface 39 to push sealing piston 24 away from retaining seat 18 as described above. The first force component taken alone, however, is insufficient to overcome the spring bias at the first predetermined level, and bypass disc 42 remains in sealing contact with upper lip 34 of grommet 30 during the initial movement of sealing piston 24 into contact with terminal pin 48. When the sealing piston moves to contact the terminal pins, the attendant compression compression of spring 46 increases the biasing force exerted against bypass disc 42 to further enhance sealing contact between the bypass disc and upper lip 34.

Figure 3:
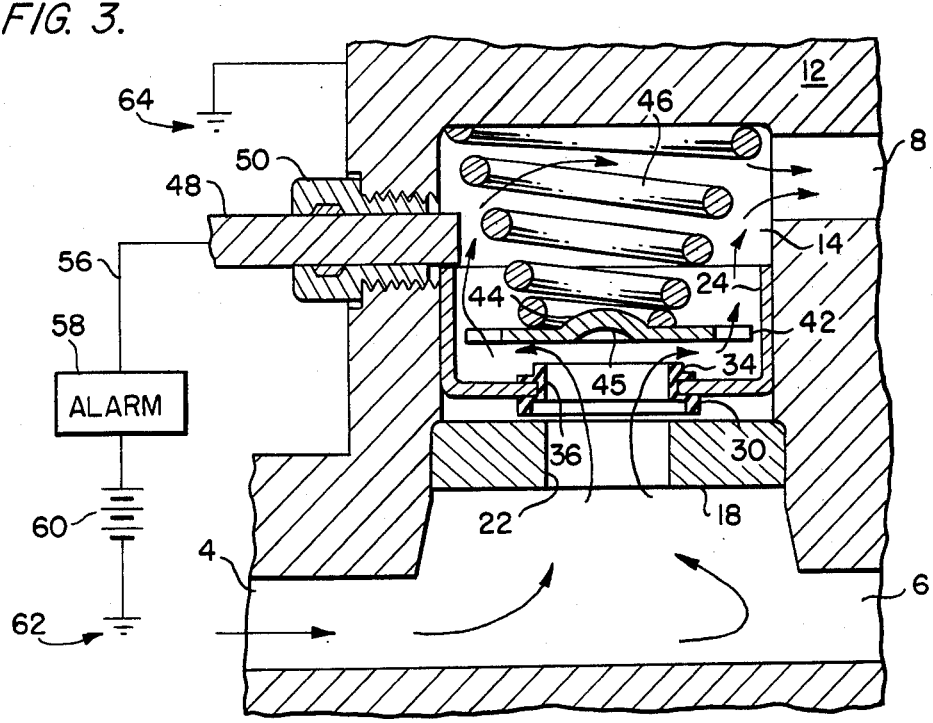
FIG. 3 is a cross-sectional view of the early warning bypass valve assembly of the present invention showing the relative position of the valve elements after the fluid pressure differential has reached the second predetermined level and the actual fluid bypass operation has been initiated.

Should the fluid pressure in the lower chamber 16 of cavity 10 continue to build beyond the first predetermined level, the valve action illustrated in FIG. 3 will occur. The force exerted by the fluid against lower surface 45 of center section 44 increases in response to the rise in fluid pressure until a second predetermined pressure differential greater than the first predetermined pressure differential is reached, whereupon the fluid force is sufficient to overcome the higher bias exerted against bypass disc 42 by spring 46. Center section 44 is pushed away from the upper lip 34 of grommet 30, permitting fluid to pass freely through bypass aperture 36 and around the lobes of bypass disc 42 into upper chamber 14, as indicated by the arrows in FIG. 3. The residual pressure in bypass conduit 8 offers less resistance to the fluid than the obstruction in outlet conduit 6, and fluid flow continues through upper chamber 14 on into bypass conduit 8 to complete the fluid bypass operation. It can also be seen in FIG. 3 that sealing piston 24 remains in contact with terminal pin 48, and alarm 58 remains energized. The point at which center section 44 uncovers bypass aperture 36 i.e., the value of the second predetermined pressure differential, can be adjusted by changing the size of spring 46 or area of surface defined by the upper sealing lip. In a similar fashion, the point at which sealing piston 24 and bypass disc 42 together uncover bore 22 in retaining seat 18, i.e., the value of the first predetermined pressure differential, may be adjusted by changing both the size of spring 46 and the area of lower surface 39 on grommet 30. The values of the first and second predetermined pressure differentials can also be modified if desired by changing the inner diameter of upper lip 34 on grommet 30 to provide additional sealing area between bypass disc 42 and bypass aperture 36. As long as the inner diameter of upper lip 34 is not made larger than the inner diameter of lower lip 32, alarm device 58 will always be energized prior to the initiation of the bypass valve operation.

Figure 4:
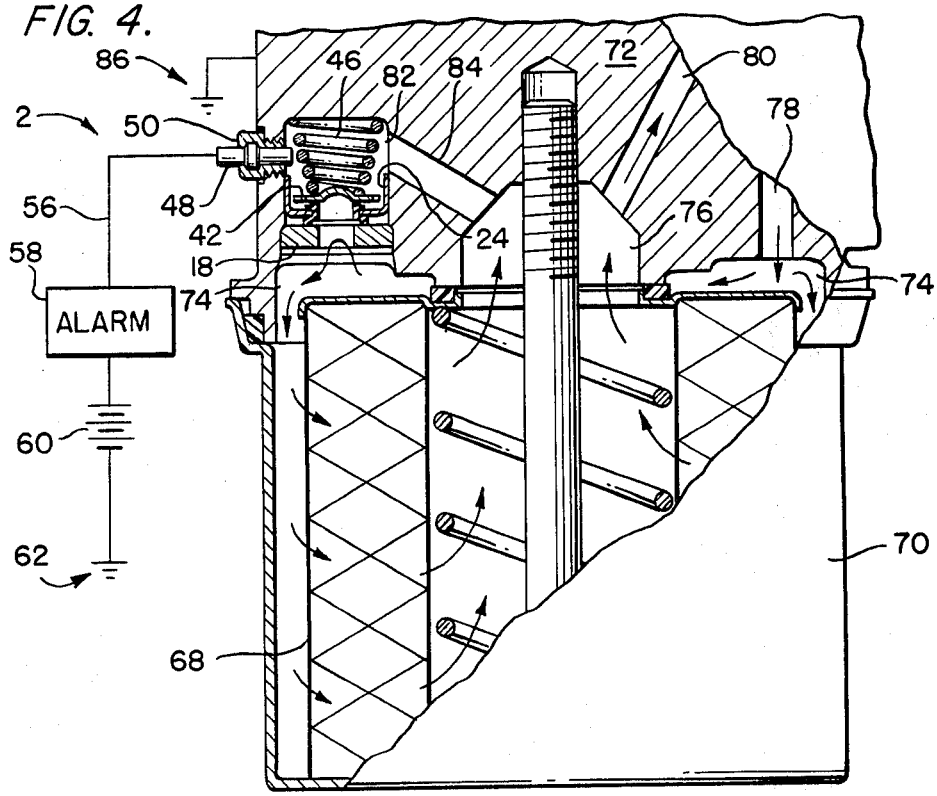
FIG. 4 is a partial cross-sectional view illustrating an early warning bypass valve assembly as installed in the oil filtering system of an internal combustion engine.

The early warning bypass valve assembly of the present invention is suitable for use in a wide variety of fluid distributing systems. For example, the valve can be installed in the lubrication circulating network of an internal combustion engine to provide a means for bypassing lubricating fluid around a clogged oil filter, thus insuring a constant supply of lubricant during engine operations. Such an application is illustrated in FIG. 4, wherein a filter element 68 mounted within a casing 70 is secured to a filter head 72. Filter head 72 is fabricated from an electrically-conductive material, and includes an annular oil receiving cavity 74 and an oil discharge cavity 76 respectively communicating with oil inlet and outlet conduits 78, 80. Filter head 72 also contains a filter bypass network consisting of an oil bypass cavity 82 extending from annular receiving cavity 74 and an oil bypass conduit 84 for conducting oil between oil bypass cavity 82 and discharge cavity 76. An early warning bypass valve assembly 2 of the type described in connection with FIGS. 1–3, including retaining seat 18, sealing piston 24, lobed bypass disc 42 and spring 46, is inserted in bypass cavity 82. Terminal pin 48 is mounted on the side of filter head 72 and projects into bypass cavity 82 at a point above sealing piston 24. As described previously, terminal pin 48 is electrically insulated from filter head 72 by an electrically nonconductive bolt 50. Grounded power source 60 and alarm device 58 are connected to terminal pin 48 as also described above, while filter head 72 is grounded as indicated at 86.

Oil enters filter casing 70 via oil inlet conduit 78 and annular receiving cavity 74 and circulates through filter element 68 before passing into discharge cavity 76. The filter element removes objectionable residues and impurities from the oil to provide a supply of clean oil for the discharge cavity. Oil is removed from the discharge cavity to lubrication points within the internal combustion engine via radially oriented oil outlet conduit 80. During normal operation the flow of oil through filter element 68 remains relatively unimpeded and the pressure differential between annular receiving cavity 74 and discharge cavity 76 is at a minimum. Hence, the pressure differential between annular receiving cavity 74 and bypass conduit 84 is at a minimum, and early warning bypass valve assembly 2 remains in the closed position of FIG. 1. If filter element 68 should become clogged or damaged, however, circulation through the filter element will be restricted and oil pressure at the upstream side of the filter element will begin to increase. This increase in oil pressure is in turn reflected throughout annular receiving cavity 74, and the pressure differential acting across early warning bypass valve assembly 2 will begin to increase as well. When the oil pressure differential reaches a first predetermined level, sealing piston 24 will snap into contact with terminal pin 48 as described in connection with FIG. 2, thereby energizing alarm device 58 and providing the engine operator with an indication of both filter failure and impending fluid bypass operation.

The "snap-action" of sealing piston 24 prevents the engine operator from deenergizing alarm circuit 58 by merely throttling back the engine speed. The temporary pressure fluctuation attributable to reduced engine RPM's will not be sufficient to enable spring 46 to overcome the greater fluid force exerted against sealing piston 24 once the sealing piston moves away from retaining seat 18. Thus, the engine operator must actually stop the engine and either replace or clean filter element 68 in order to deactivate alarm device 58. If engine operation is continued without removal of the clogged or damaged filter element, the oil pressure inside annular receiving cavity 74 continues to rise until the second predetermined pressure differential is reached, at which point the fluid bypass operation illustrated in FIG. 3 occurs. Oil is then rerouted around clogged filter element 68, passing instead through retaining seat 18, sealing piston 24 and bypass conduit 84 into discharge cavity 76. In this manner a constant bypass supply of lubricant to the engine is assured to prevent filter rupture or bearing starvation sufficient to cause catastrophic failure. Alarm device 58 remains energized as a remainder to the engine operator of the failure of the filtering element.

In addition to filter media deterioration, the lubrication system may also be subject to isolated transient, ambient, or maintenance conditions (outside of recommended practice) which can create excessive supply flow surges. These excessive flow levels, if not vented or relieved, can quickly rupture even a new filter; thus defeating its purpose thru the normal change interval. Flow surges of this magnitude will initiate both an alarm and bypass mode by design and alert the operator to the operational problem/technique which is not necessarily associated with filter deterioration.

Figure 5:
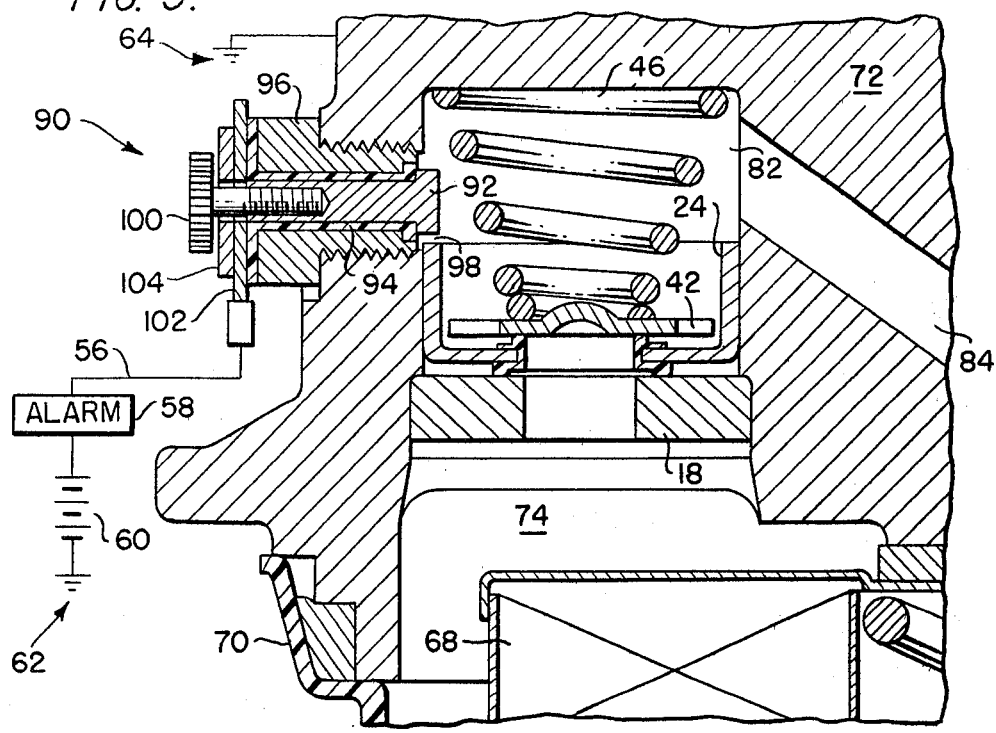
FIG. 5 is a partial cross-sectional view of another embodiment of the subject invention including a coated T-shaped terminal pin.

An alternate embodiment of a warning circuit 90 for use with the early warning bypass valve assembly of the present invention is disclosed in FIG. 5. Warning circuit 90 is installed in a filter head 72 of the type shown in FIG. 4, but it should be noted that the circuit is not limited solely to oil filter bypass applications. The early warning bypass valve assembly of FIG. 5 again includes a retaining seat 18, a cup-shaped sealing piston 24, a lobed bypass disc 42 and a spring 46 disposed within a bypass cavity 82 and operable to conduit oil from an annular receiving cavity 74 to an oil bypass conduit 84 in response to the clogging of filter element 68. Terminal pin 48 of the FIGS. 1–4 embodiment, however, is replaced by a T-shaped terminal pin 92 which is coated with a layer of insulating material 94 such as silicon and embedded in a bolt structure 96. Bolt structure 96 is in turn threaded through a hole formed in filter head 72 to position terminal pin 92 in oil bypass cavity 82 such that a small clearance 98 is present between terminal pin 92 and sealing piston 24 when the sealing piston is seated against retaining seat 18. A screw or bolt arrangement 100 is employed to electrically secure a metallic lug 102 to terminal pin 92, and if desired a washer 104 may be inserted between bolt 100 and lug 102. Ground 64, ground 62, power source 60 and alarm device 58 are provided as in FIGS. 1-4. The construction of warning circuit 90 is completed by connecting electrical lead 56 from alarm device 58 to lug 102. The warning circuit, of course, is energized when sealing piston 24 is snapped into contact with terminal pin 92 in accordance with the teachings of FIG. 2.

Figure 6:
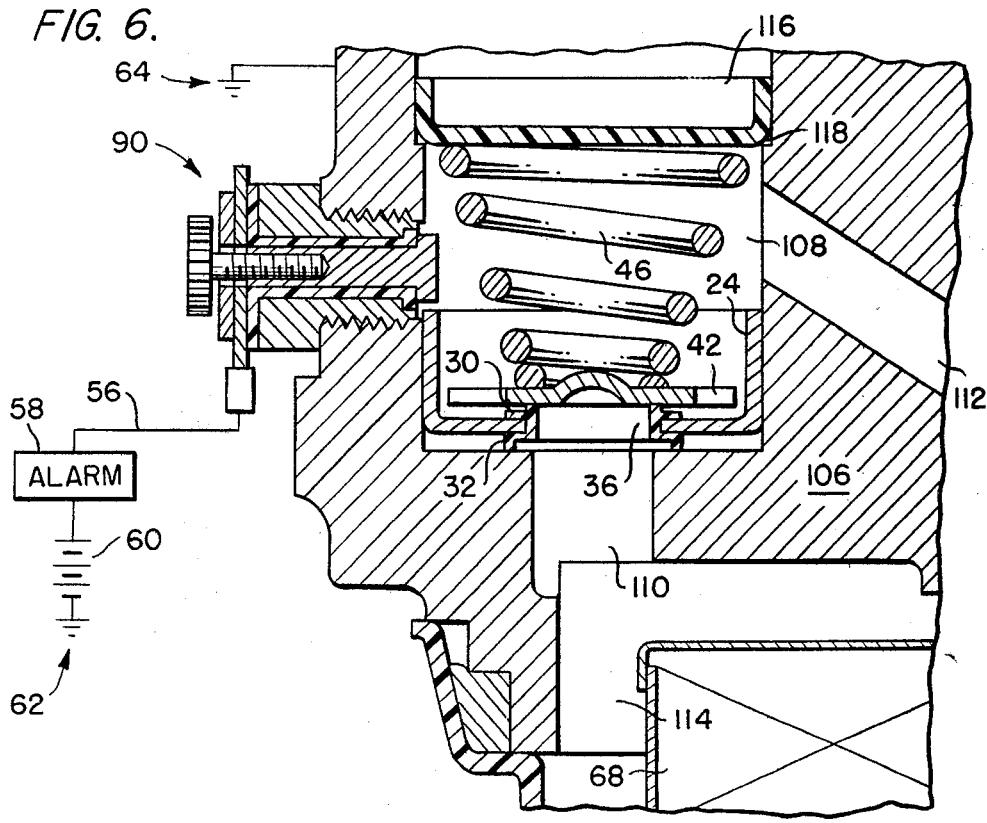
FIG. 6 is a partial cross-sectional view of yet another embodiment of the subject invention including a cup plug for sealing one end of the bypass cavity containing the bypass valve.

Yet another embodiment of the present invention is shown in FIG. 6. In FIG. 6, the filter head of the FIGS. 4 and 5 embodiments is modified to form a new filter head 106 having an oil bypass cavity 108 in fluid communication with both an intermediate oil inlet conduit 110 and an oil bypass conduit 112. Intermediate oil bypass conduit 110 connects oil bypass cavity 108 with an annular receiving cavity 114 such as annular receiving cavity 74 of FIGS. 4 and 5. Warning circuit 90, sealing piston 24 including grommet 30, lobed bypass disc 42 and spring 46 are all disposed within oil bypass cavity 108 as previously illustrated. Intermediate oil inlet conduit 110, however, is positioned directly beneath bypass aperture 36 in sealing piston 24 and has a diameter less than the inner diameter of lower lip 32 on grommet 30. Hence, sealing piston 24 seats directly against the structure of filter head 106, and the need for a retaining seat such as retaining seat 18 of FIGS. 1-5 is eliminated. A cup plug 116 fitted in a recess 118 formed at the top of oil bypass cavity 108 seals off the oil bypass cavity and provides a seating surface for spring 46. The exact position and configuration of cup plug 116 may be arranged to adjust the tension in spring 46 as desired. The early warning bypass valve assembly components of FIG. 6 function in the manner described hereinabove to provide early warning capability and fluid bypass operation, thus enhancing the reliability of the oil filtering operation in an internal combustion engine.

Figure 7:
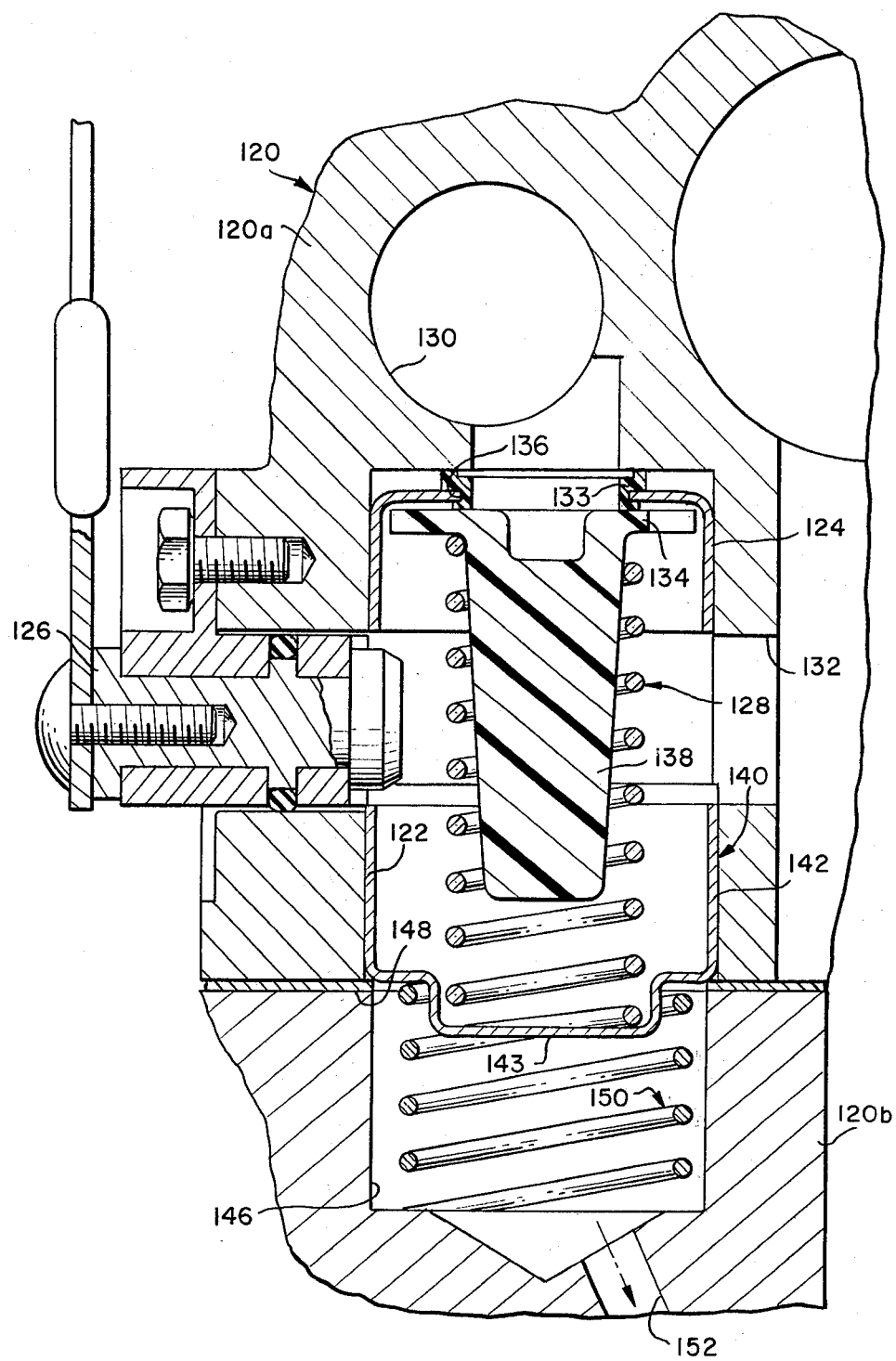
FIG. 7 is a partial cross-sectional view of still another embodiment of the subject invention in which a low pressure sensing means is incorporated in the early warning bypass valve assembly.

Still another embodiment of the subject invention is disclosed in FIG. 7. This embodiment is capable of performing the same functions as the embodiments illustrated in FIGS. 1-6 and, in addition, it is capable of producing an alarm whenever the pressure within the bypass conduit falls below a predetermined level. In particular, the embodiment of FIG. 7 includes a housing 120 containing an inlet conduit 130, a bypass conduit 132, and a cylindrical cavity 122, in which a cup-shaped sealing piston 124 (similar to piston 24 described above) is placed for sliding movement between a "no alarm" position (illustrated in FIG. 7) and an "alarm" position in which an electrical connection is formed between housing 120 and electrical terminal 126 through sealing piston 124. As with the embodiments discussed before, sealing piston 124 is biased toward the "no-alarm" position by a helical coil spring 128. In the "no-alarm" position, inlet conduit 130 is sealed off. Sealing piston 124 moves to the "alarm" position when the fluid pressure in inlet conduit 130 exceeds the pressure in bypass conduit 132 by a first predetermined amount. If the fluid pressure differential between conduits 130 and 132 increases still higher to a second predetermined level, a bypass disc or plunger 134 (also biased by spring 128 to a closed position) is moved to open bypass aperture 136 contained in sealing piston 124 to allow fluid to pass from inlet 130 through cavity 122 into bypass passage 132. A grommet 133, similar in shape and function to grommet 30 of FIGS. 1-6, is placed in bypass aperture 136.

Unlike the embodiments described above, bypass disc or plunger 134 includes a central portion 138 which extends axially into the coil spring 128 to form a stop for disc 134 when disc 134 moves to its open position as will be described more fully below.

A low pressure sensing means 140 is also provided in the embodiment of FIG. 7 including a low pressure piston 142 disposed within cavity 122 in opposed relationship with sealing piston 124. Piston 142 is arranged to slide longitudinally within cavity 122 while sealing the portions of cavity 122 located on opposite sides of piston 142.

In the specific embodiment of FIG. 7, housing 120 is formed in two sections 120a and 120b. Housing section 120b contains the major portion of cavity 122 within which pistons 124 and 142 are retained while housing section 120b contains an extension 146 of cavity 122 having a reduced diameter to form a shoulder 148 which operates as a stop for low pressure piston 142. Disposed within cavity extension 146 is a helical coil spring 150 for biasing piston 142 toward piston 124 into a low pressure alarm position in which it is in engagement with electrical terminal 126. Because piston 142 is formed of or coated with electrically conductive material, an electrical path is formed through conductive housing 120, piston 142, terminal 126 and the alarm circuit (not illustrated in FIG. 7) whenever piston 142 is in the low pressure alarm position. The spring rate of coil spring 150 is carefully selected to be greater than the rate of spring 128 so that piston 142 will reside in the alarm position unless the differential in fluid pressure on opposite sides of piston 142 is sufficient to overcome the differential in spring force exerted on low pressure piston 142. Cavity extension 146 may be continuously vented through vent passage 152 to atmospheric pressure or other relatively fixed low pressure environment such as the crankcase of an internal combustion engine if the assembly of FIG. 7 is used in a lubrication system of an internal combustion engine. By venting cavity extension 146 to the crankcase, any leakage of lubrication oil around the low pressure piston 142 would be returned to the crankcase. Because the portion of cavity 122 between pistons 124 and 142 remains continuously in communication with bypass conduit 132, low pressure piston 142 responds to the variations in the fluid pressure in bypass conduit 132. Whenever the pressure in bypass conduit 132 rises to a predetermined minimum level, low pressure piston 142 will be moved downwardly as illustrated in FIG. 7 to a "no alarm" position in which low pressure piston 142 engages shoulder 148. If the fluid pressure in bypass conduit 132 falls below this predetermined minimum, low pressure piston 142 moves upwardly into engagement with terminal 126 to complete the alarm circuit described above.

As can be seen in FIG. 7, low pressure piston 142 includes a depressed portion 143 for retaining in position the ends of springs 128 and 150 which engage low pressure piston 142. Portion 143 also forms a stop for bypass disc 134. When fluid pressure in inlet conduit 130 is sufficient to open aperture 136 by moving disc 124 downwardly as illustrated in FIG. 7, central portion 138 will engage portion 143 to operate as a stop for bypass disc 134. Central portion 138 thus functions to prevent disc 134 from being moved into an inoperative position in which spring 128 could not return it to its closed position.

If the assembly of FIG. 7 is used in a lubrication system of an internal combustion enigne, low pressure piston 142 can be used to provide an indication of inadequate oil pressure in the engine. In particular, bypass conduit 132 would be in communication with the lubrication circuit supplying oil to the engine. The differential in spring force applied to piston 142 could be preset to cause piston 142 to move to the "no alarm" position only when the oil pressure in the lubrication flow circuit of the engine is above the predetermined safe level.

A particular advantage of the disclosed embodiment of FIG. 7 is that it is capable of performing a multitude of functions despite an extremely small number of elements. For example, the single electrical terminal 126 serves both the low pressure piston 142 and the high pressure responsive sealing piston 124 to activate the alarm circuit whenever an undesirable condition is detected. The valve assembly formed by disc 134 operates to bypass fluid from inlet conduit 130 into bypass conduit 132 upon excessive fluid pressure by using the same biasing spring 128 and cavity 122 as does the early warning high pressure sensing assembly formed by piston 124 and terminal 126.

Only four embodiments of the present invention have been shown and described in the specification. It is nevertheless understood that various additional changes and modifications in the form and detail of the novel bypass valve and warning circuit disclosed above may be made by those skilled in the art without departing from the scope and spirit of the invention. It is, therefore, the intention of the inventor to be limited only by the following claims.

I claim:
1. A valve and alarm assembly, comprising
   (a) a housing containing an inlet conduit, a bypass conduit and a cavity communicating with the inlet conduit and the bypass conduit;
   (b) alarm means for generating an alarm signal indicative of fluid pressure conditions within the inlet conduit and the bypass conduit;
   (c) first piston means for activating said alarm means whenever the fluid pressure within the inlet conduit is above the fluid pressure within the bypass conduit by a first differential level, said first piston means including a sealing piston mounted for movement within the cavity between an off position and an on position;
   (d) second piston means for activating said alarm means whenever the fluid pressure within the bypass conduit is below a predetermined pressure level, said second piston means including a low pressure piston movable between an alarm position and a no alarm position; and
   (e) bypass valve means for allowing fluid to flow from the inlet conduit into the bypass conduit whenever the fluid pressure within the inlet conduit is above the fluid pressure within the bypass conduit by a second differential level which is greater than the first differential level, said bypass valve means being mounted on said sealing piston.
2. A valve and alarm assembly as defined in claim 1, wherein said housing includes electrically conductive structure and electrical terminal means for causing the alarm signal to be generated whenever electrically connected to said electrically conductive structure, and further wherein said sealing piston and said low pressure piston operate to electrically connect said electrically conductive structure to said terminal means whenever said sealing piston is in its on position or said low pressure piston is in its alarm position.

3. A valve and alarm assembly as defined in claim 1 or 2, wherein said sealing piston contains a bypass aperture and wherein said bypass valve means includes a valve disc movable between an open position in which fluid may flow from the inlet conduit into the bypass conduit through the bypass aperture and a closed position in which fluid may not pass through the bypass aperture.

4. A valve and alarm assembly as defined in claim 3, further including a first coil spring interposed between said sealing piston and said low pressure piston for biasing said low pressure piston toward its no alarm position and for biasing said sealing piston toward its off position and further including a second coil spring for biasing said low pressure piston toward its alarm position with a force greater than the force of said first coil spring biasing said low pressure piston toward its no alarm position.

5. A valve and alarm assembly as defined in claim 4, wherein said valve disc is interposed between said first coil spring and said sealing piston and is biased toward its closed position by said first coil spring, said bypass valve means includes a central portion connected with said valve disc, said central portion extending coaxially through said first coil spring toward said sealing piston for a distance sufficient to cause said central portion to form a stop for said valve disc when said valve disc is moved to its open position and wherein said low pressure piston includes a depressed portion for concentrically positioning corresponding ends of said first and second coil springs.

6. A valve and alarm assembly as defined in claim 5, further including snap action means for causing and sealing piston to move from its off position to its on position upon the fluid pressure in the inlet conduit exceeding the fluid pressure in the bypass conduit by the first differential level and for causing said sealing piston to return from its on position to its off position only when the fluid pressure differential level in the inlet and bypass conduits diminishes to a third differential level which is less than the first differential level.

7. A valve and alarm assembly as defined in claim 6, wherein said snap-action means is a grommet surrounding the bypass aperture shaped to allow the fluid pressure within the inlet conduit to operate against a smaller effective area of said sealing piston when the said sealing piston is in its off position than when said sealing piston is moving toward its on position, said grommet further being shaped to restrict the effective area of said valve disc against which the fluid pressure in the inlet conduit operates to an effective area smaller than said effective area of said sealing piston.

8. A valve apparatus for governing fluid flow between inlet and bypass conduits in fluid communication with a cavity formed in supporting structure at the intersection of the inlet and bypass conduits and for completing an electrical circuit between an alarm device and an electrically-conductive portion of the supporting structure, said valve apparatus including
   (a) terminal means for providing an electrical path between the alarm device and the interior of the cavity;
   (b) piston means mounted within the cavity between the bypass conduit and the inlet conduit for movement between an off position in which said piston means is electrically isolated from said terminal means and an on position in which said piston means electrically contacts both said terminal means and the electrically conductive portion of the supporting structure to energize the alarm device, said piston means having a bypass aperture formed therein to provide for fluid communication between the inlet and bypass conduits;

(c) disc means mounted within the cavity for movement between a closed position in which said disc means covers said bypass aperture in said piston means to prevent fluid communication between the inlet and bypass conduits and an open position in which fluid flows from the inlet conduit through said bypass aperture to the bypass conduit;

(d) biasing means for exerting a biasing force to urge said disc means toward said closed position and for simultaneously urging said piston means toward said off position such that a first predetermined fluid pressure differential between the inlet and bypass conduits will overcome said biasing force to move said piston means to said on position while a second, relatively greater predetermined fluid pressure differential between the inlet and bypass conduits will overcome said biasing force to move said disc means to said open position; and (e) low pressure sensing means for completing the electrical circuit to energize the alarm device whenever the fluid pressure within the bypass conduit falls below a predetermined low pressure level.

9. A valve apparatus for governing fluid flow between inlet and bypass conduits in fluid communication with a cavity formed in supporting structure at the intersection of the inlet and bypass conduits and for completing an electrical circuit between an alarm device and an electrically-conductive portion of the supporting structure, said valve apparatus including (a) terminal means for providing an electrical path between the alarm device and the interior of the cavity;

(b) piston means mounted within the cavity between the bypass conduit and the inlet conduit for movement between an off position in which said piston means is electrically isolated from said terminal means and an on position in which said piston means electrically contacts both said terminal means and the electrically conductive portion of the supporting structure to energize the alarm device, said piston means having a lower surface in fluid communication with the inlet conduit and a bypass aperture formed in said piston means to provide for fluid communication between the inlet and bypass conduits;

(c) disc means having a lower surface in fluid communication with the inlet conduit and being mounted within the cavity for movement between a closed position in which said disc means covers said bypass aperture in said position means to prevent fluid communication between the inlet and bypass conduits and an open position in which fluid flows from the inlet conduit through said bypass aperture to the bypass conduit;

(d) biasing means for exerting a biasing force to urge said disc means toward said closed position and for simultaneously urging said piston means toward said off position such that a first predetermined fluid pressure differential between the inlet and bypass conduits acting between said bypass conduit and both said lower surface of said piston means and said lower surface of said disc means will overcome said biasing force to move said piston means to said on position while a second, relatively greater predetermined fluid pressure differential between the inlet and bypass conduits acting between said bypass conduit and said lower surface of said disc means alone will overcome said biasing force to move said disc means to said open position; and (e) low pressure sensing means for completing the electrical circuit to energize the alarm device whenever the fluid pressure within the bypass conduit falls below a predetermined low pressure level.

10. A valve apparatus for governing fluid flow between inlet and bypass conduits in fluid communication with a cavity formed in supporting structure at the intersection of the inlet and bypass conduits and for completing an electrical circuit between an alarm device and an electrically-conductive portion of the supporting structure, said valve apparatus including (a) terminal means for providing an electrical path between the alarm device and the interior of the cavity;

(b) piston means mounted within the cavity between the bypass conduit and the inlet conduit for movement between an off position in which said piston means is electrically isolated from said terminal means and an on position in which said piston means electrically contacts both said terminal means and the electrically conductive portion of the supporting structure to energize the alarm device, said piston means having a lower surface in fluid communication with the inlet conduit and a bypass aperture formed in said lower surface of said piston means to provide for fluid communication between the inlet and bypass conduits;

(c) disc means having a lower surface in fluid communication with the inlet conduit and being mounted within the cavity for movement between a closed position in which said disc means covers said bypass aperture in said piston means to prevent fluid communication between the inlet and bypass conduits and an open position in which fluid flows from the inlet conduit through said bypass aperture to the bypass conduit;

(d) biasing means for exerting a biasing force to urge said disc means toward said closed position and for simultaneously urging said piston means toward said off position such that a first predetermined fluid pressure differential between the inlet and bypass conduits acting between said bypass conduit and both said lower surface of said piston means and said lower surface of said disc means will overcome said biasing force to move said piston means to said on position while a second, relatively greater predetermined fluid pressure differential between the inlet and bypass conduits acting between said bypass conduit and said lower surface of said disc means alone will overcome said biasing force to move said disc means to said open position;

(e) retaining means positioned between said piston means and the inlet conduit, said retaining means having a supporting surface which contacts said piston means when said piston means is in said off position, said supporting surface including a bore for providing fluid communication between said bypass aperture and the inlet and outlet conduit; and (f) low pressure sensing means for completing the electrical circuit to energize the alarm device whenever the fluid pressure within the bypass conduit falls below a predetermined low pressure level.

11. A valve apparatus as defined in claims 8, 9 or 10, wherein said low pressure sensing means includes a low pressure piston mounted for sliding movement within the cavity in opposed relationship with said piston means, said low pressure piston including electrically conductive material, said low pressure piston moving from a no alarm position in which said low pressure piston is electrically isolated from said terminal means whenever the pressure within the bypass conduit is above said predetermined low pressure level and an alarm position in which said low pressure piston contacts both said terminal means and the electrically conductive portion of the supporting structure whenever the pressure within the bypass conduit is below said predetermined low pressure level.

12. A valve apparatus for governing fluid flow between inlet and bypass conduits in fluid communication with a cavity formed in supporting structure at the intersection of the inlet and bypass conduits and for completing an electrical circuit between an alarm device and an electrically-conductive portion of the supporting structure, said valve apparatus including
    (a) terminal means having a pin structure which projects into said cavity for providing an electrical path between the alarm device and the interior of the cavity;
    (b) piston means mounted within the cavity between the bypass conduit and the inlet conduit for movement between an off position in which said piston means is electrically isolated from said terminal means and an on position in which said piston means electrically contacts both said terminal means pin structure and the electrically conductive portion of the supporting structure to energize the alarm device, said piston means having a bypass aperture formed therein to provide for fluid communication between the inlet and bypass conduits;
    (c) disc means mounted within the cavity for movement between a closed position in which said disc means covers said bypass aperture in said piston means to prevent fluid communication between the inlet and bypass conduits and an open position in which fluid flows from the inlet conduit through said bypass aperture to the bypass conduit;
    (d) biasing means for exerting a biasing force to urge said disc means toward said closed position and for simultaneously urging said piston means toward said off position such that a first predetermined fluid pressure differential between the inlet and bypass conduits will overcome said biasing force to move said piston means to said on position while a second, relatively greater predetermined fluid pressure differential between the inlet and bypass conduits will overcome said biasing force to move said disc means to said open position; and
    (e) low pressure sensing means for completing the electrical circuit to energize the alarm device whenever the fluid pressure within the bypass conduit falls below a predetermined low pressure level.

13. A valve apparatus as defined in claim 12, wherein said low pressure sensing means includes a low pressure piston mounted for sliding movement within the cavity in opposed relationship with said piston means, said low pressure piston including electrically conductive material, said low pressure piston moving from a no alarm position in which said low pressure piston is electrically isolated from said terminal means whenever the pressure within the bypass conduit is above said predetermined low pressure level and an alarm position in which said low pressure piston contacts both said terminal means pin structure and the electrically conductive portion of the supporting structure whenever the pressure within the bypass conduit is below said predetermined low pressure level.

* * * * *